(12) United States Patent
Morita et al.

(10) Patent No.: US 7,303,350 B2
(45) Date of Patent: Dec. 4, 2007

(54) INK COMPOSITION FOR PRESSURIZED BALL-POINT PEN AND PRESSURIZED BALL-POINT PEN

(75) Inventors: Masaaki Morita, Fujioka (JP); Hiroyuki Ito, Fujioka (JP)

(73) Assignee: Mitsubishi Pencil Co., Ltd., Tokyo (JP)

(*) Notice: Subject to any disclaimer, the term of this patent is extended or adjusted under 35 U.S.C. 154(b) by 470 days.

(21) Appl. No.: 10/514,486

(22) PCT Filed: May 23, 2003

(86) PCT No.: PCT/JP03/06484

§ 371 (c)(1),
(2), (4) Date: Nov. 16, 2004

(87) PCT Pub. No.: WO03/102094

PCT Pub. Date: Nov. 12, 2003

(65) Prior Publication Data

US 2006/0013641 A1    Jan. 19, 2006

(30) Foreign Application Priority Data

May 31, 2002  (JP) .............................. 2002-159683

(51) Int. Cl.
*A46B 5/02* (2006.01)
*B43K 7/00* (2006.01)
*C09D 11/00* (2006.01)

(52) U.S. Cl. .................. 401/190; 401/209; 106/31.13

(58) Field of Classification Search ............ 401/188 A, 401/209, 190, 221, 222; 106/31.13; 523/161
See application file for complete search history.

(56) References Cited

U.S. PATENT DOCUMENTS 3,659,951 A * 5/1972 Germann ................... 401/190
4,419,464 A * 12/1983 Williams et al. ............ 523/161
4,789,399 A   12/1988 Williams et al.

FOREIGN PATENT DOCUMENTS

| JP | 47-48565 | 12/1972 |
| JP | 50-96336 | 7/1975 |
| JP | 60-186574 A | 9/1985 |
| JP | 62-7775 A | 1/1987 |
| JP | 10-195365 A | 7/1998 |

* cited by examiner

Primary Examiner—David J. Walczak
(74) Attorney, Agent, or Firm—Buchanan Ingersoll & Rooney PC (57) ABSTRACT

An ink composition for a pressurized ballpoint pen and a pressurized ballpoint pen which can exhibit excellent writing properties, do not cause ink leakage and which are suited to handwriting. The ink composition for a pressurized ballpoint pen includes at least a colorant, a solvent and silica, wherein a coagulated matter containing at least the silica is contained therein, and the ink composition has a viscosity of 10000 to 40000 mPa·s at 25° C. A pressurized ballpoint pen equipped with a refill, in which pressurized gas is charged into an ink reservoir charged with the ink composition for a pressurized ballpoint pen and a closed vessel containing the reservoir is also set forth.

8 Claims, 1 Drawing Sheet

INK COMPOSITION FOR PRESSURIZED BALL-POINT PEN AND PRESSURIZED BALL-POINT PEN

TECHNICAL FIELD

The present invention relates to an ink composition for a pressurized ballpoint pen and a pressurized ballpoint pen, more specifically to an ink composition for a pressurized ballpoint pen and a pressurized ballpoint pen which are excellent in a writing property and do not cause ink leakage and which are suited to handwriting.

BACKGROUND ART

In general, known as a ballpoint pen are a gravity type (free atmospheric type) ballpoint pen comprising a ballpoint pen tip, an ink reservoir and an ink filled thereinto and a so-called pressurized type ballpoint pen in which pressurized gas such as nitrogen gas is charged into an ink reservoir filled with an ink and a closed vessel containing it.

The above pressurized type ballpoint pen has the advantages that upward writing is possible and that an ink having a specific function can be used, but an ink reservoir charged with an ink is always pressurized, so that a small amount of the ink is apt to leak from a pen tip.

In order to prevent the above matter, an apparent viscosity of an ink has to be raised, and this brings about the problems that a write feeling becomes heavier and it takes time to charge an ink reservoir with an ink and that the ink is liable to be stuck onto the inside of the ink reservoir, that is, a so-called clear drain property is inferior.

On the other hand, it is described in Japanese Patent Publication No. 48565/1972 that the main point is to prepare a writing instrument in which an ink or a fluid is not allowed to flow out in the vicinity of a ball of the ballpoint pen tip in the form of a pressurized writing or marking instrument, and disclosed therein is a ballpoint pen writing instrument characterized by that a writing fluid for the above writing instrument comprises at least one solvent, one colorant and at least one polymer which is soluble in the above solvent and which can provide the above fluid with a viscoelasticity, a strong coagulating property, a strong sticking property, a fluid resistance and a film-forming property together with the other components for the writing fluid, wherein the above writing fluid has a viscosity of 100000 cps or more (measured at 25° C. and 0.3 rpm using a fifth cylindrical spindle in a Brookfield LMT viscometer), and a cross-linking carboxypolymethylene type polymer or polyvinylpyrrolidone type polymer or both of them is used as the above polymer.

Further, a thixotropic ink for a pressurized ballpoint pen containing higher fatty acid soap is disclosed in Japanese Patent Application Laid-Open No. 096336/1975, and the viscosities of 600000 cps and 800000 cps are given in the examples.

Further, an ink composition having metallic gloss which is set to a viscosity of 50000 cps or more is disclosed in Japanese Patent Application Laid-Open No. 186574/1985. Also, an ink for a pressurized ballpoint pen used for a plotter is disclosed in Japanese Patent Application Laid-Open No. 7775/1987, and it is described that the viscosity thereof falls preferably in a range of 40000 to 500000 cps.

However, any ink compositions for pressurizing disclosed in the respective official gazettes described above have a high viscosity, and there still remain the problems described above, that is, the problems that an ink leaks from a pen tip is small amount; a write feeling becomes heavier; it takes time to charge an ink reservoir with an ink; an ink is liable to be stuck onto the inside of an ink reservoir, and a so-called clear drain property is inferior, and so on.

On the other hand, an oil-based ink for a ballpoint pen containing silica having a primary average particle diameter of 7 to 40 nm is disclosed in Japanese Patent Application Laid-Open No. 195365/1998 which is a prior art applied by the present inventors.

In the above prior art, however, it is described in the specification that "a pen body rises in a temperature when exposed to direct sunlight or an ink leaks from a pen tip in a certain case when left standing downward for long time", and it is a technique related to a gravity type (free atmospheric type) ballpoint pen. More specifically, it is described that a content of silica is 0.01 to 2.0% by weight, preferably 0.03 to 1.0% by weight, and it is 0.3% by weight, 1.0% by weight, 0.05% by weight and 0.5% by weight respectively in order in Examples 1 to 4. A supplementary examination carried out by applying ballpoint pens specifically described in Example 2 (1.0% by weight) and Example 4 (0.5% by weight) to pressurized ballpoint pens under the same conditions as in examples described later has made it clear to bring about the problem that an ink leaks from a pen tip. Further, observation of the above oil-based ink under an optical microscope has shown that coagulated matters containing silica are not found and that the ink stays in a homogeneous state. Accordingly, the oil-based ink described in the above official gazette is different from the ink of the present invention in uses, recognition of the problems and ink physical properties.

In light of the problems on the conventional techniques described above, the present invention intends to solve them, and an object thereof is to provide an ink composition for a pressurized ballpoint pen and a pressurized ballpoint pen, wherein an ink is prevented from leaking from a pen tip; a write feeling is excellent; time for charging an ink reservoir with the ink can be shortened; and a clear drain property is excellent as well.

DISCLOSURE OF THE INVENTION

Intensive investigations repeated by the present inventors on the conventional problems described above have resulted in successfully achieving the object described above by an ink composition for a pressurized ballpoint pen comprising at least a colorant, a solvent and silica and a pressurized ballpoint pen charged with the above ink composition, wherein the above ink composition has a viscosity falling in a specific range, and the physical properties fall in specific ranges. Thus, the present applicant has come to complete the present invention.

That is, the present invention resides in the following items (1) to (7).

(1) An ink composition for a pressurized ballpoint pen comprising at least a colorant, a solvent and silica, wherein a coagulated matter containing at least silica is contained therein, and the ink composition has a viscosity of 10000 to 40000 mPa·s at 25° C.

(2) The ink composition for a pressurized ballpoint pen as described in the above item (1), wherein the viscosity is 20000 to 35000 mPa·s at 25° C.

(3) The ink composition for a pressurized ballpoint pen as described in the above item (1) or (2), wherein the coagulated matter containing at least silica has a size of 1 to 100 μM.

(4) The ink composition for a pressurized ballpoint pen as described in any of the above items (1) to (3), wherein 10 or more coagulated matters containing at least silica are observed in a range of 500 μm×500 μm under an optical microscope.

(5) The ink composition for a pressurized ballpoint pen as described in any of the above items (1) to (4), wherein silica has a specific surface area of 80 $m^2/g$ or more measured by the BET method.

(6) The ink composition for a pressurized ballpoint pen as described in any of the above items (1) to (5), wherein the colorant contains a pigment.

(7) A pressurized ballpoint pen characterized by having a refill, in which pressurized gas is charged into an ink reservoir charged with the ink composition for a pressurized ballpoint pen as described in any of the above items (1) to (6) and a closed vessel containing the reservoir.

BEST MODE FOR CARRYING OUT THE INVENTION

The embodiments of the present invention shall be explained below in details by invention.

The ink composition of the present invention for a pressurized ballpoint pen is an ink composition comprising at least a colorant, a solvent and silica, wherein a coagulated matter containing at least silica is contained therein, and the ink composition has a viscosity of 10000 to 40000 mPa·s at 25° C.

The colorant used in the present invention shall not specifically be restricted as long as it is a colorant used for a pressurized ballpoint pen, and it includes a dye and a pigment.

The dye includes, for example, organic solvent-soluble dyes which are classified into a solvent dye in a color index. The specific examples of the above solvent dye include Valifast Black 3806 (C. I. Solvent Black 29), ditto 3807 (trimethylbenzylammonium salt of the dye of C. I. Solvent Black 29), Spirit Black SB (C. I. Solvent Black 5), Spiron Black GMH (C. I. Solvent Black 43), Valifast Red 1308 (salt-forming matter of the dye of C. I. Basic Red 1 and the dye of C. I. Acid Yellow 23), Valifast Yellow AUM (salt-forming matter of the dye of C. I. Basic Yellow 2 and the dye of C. I. Acid Yellow 42), Spiron Yellow C2 GH (organic acid salt of the dye of C. I. Basic Yellow 2), Spiron Violet CRH(C. I. Solvent Violet 8-1), Valifast Violet 1701 ((salt-forming matter of the dye of C. I. Basic Violet 1 and the dye of C. I. Acid Yellow 42), Spiron Red CGH (organic acid salt of the dye of C. I. Basic Red 1), Spiron Pink BH (C. I. Solvent Red 82), Nigrosine Base EX (C. I. Solvent Black 7), Oil Blue 603 (C. I. Solvent Blue 5), Neozapon Blue 808 (C. I. Solvent Blue 70) and the like.

The pigment includes, for example, inorganic pigments such as carbon black, graphite and titanium dioxide pigments, extender pigments such as talc, alumina, mica and alumina silicate, organic pigments such as azo or condensed azo base pigments, phthalocyanine base pigments, anthraquinone pigments, quinacridone pigments, isoindolinone base pigments, diketopyrrolopyrrole base pigments and various lake pigments, fluorescent pigments, pearl pigments and gold and silver metallic pigments.

Carbon black includes, for example, commercially available carbon blacks produced by various production processes such as furnace black, channel black and acetylene black, to be specific, Printex 75, Printex 60, Printex 45, Printex 35, Printex 25, Printex 200, Printex A, Printex G, Special Black 550, Special Black 350, Special Black 250, Special Black 100, Lamp Black 101, Special Black 4, Printex U, Printex V (all manufactured by Degussa AG), Monarch 900, Monarch 880, Monarch 800, Monarch 700, Regal 1660R, Regal 1500R, Regal 1415R, Regal 1300R, Regal 1250R, Regal 1991, Elftex 8, Sterling R, Mogul-L (all manufactured by Cabot Co., Ltd.), #1000, #900, MCF-88, MA7, MA8, #52, #45, #40, #33, #30, CF9 (all manufactured by Mitsubishi Chemical Corporation), Raven 1500, Raven 1200, Raven 1170, Raven 1040, Raven 1000, Raven 890, Raven 850, Raven 500, Raven 450, Raven 420, Raven 410, Paven H16, Raven H16, Raven H14, Royal Spevtra A and Neo Spevtra A Mark IV (all manufactured by Columbian Co., Ltd.). However, it shall not be restricted to them.

Graphite can be used as a black pigment and a lubricant, and capable of being used are graphites having various properties and sizes such as artificial graphite, natural graphite, scaly graphite, massive graphite and soil-like graphite.

Various blue pigments can be used as the blue organic pigment and include, for example, C. I. Pigment Blue 15, 15:1, 15:2, 15:3, 15:4, 15:6, 16, 17, 28, 29 and 36, and C. I. Pigment Blue 60, and they may be treated with a surfactant in the production step of the pigments.

In particular, the specific examples of the blue pigment include pigments such as Graphthol Blue 2GLS, Sandorin Blue RL and Sandorin Blue 91052 manufactured by Clariant Co., Ltd., Lutetiacyanine CSN manufactured by ICI Ltd., Palomar Blue B4806 and Palomar Blue B4707 manufactured by Mobay Co., Ltd., Endurophtal Blue BT-788D manufactured by Worlee Co., Ltd., Phthalocyanine Blue RS1517C manufactured by Cappelle Co., Ltd., Heliogen Blue L6920, Heliogen Blue L6875F, Heliogen Blue L6901F, Heliogen Blue L6905F, Heliogen Blue L6975F, Heliogen Blue L6989F, Heliogen Blue L7072D, Heliogen Blue L7080, Heliogen Blue L7101F and Heliogen Blue L6700F manufactured by BASF AG, Monastral Blue FBN, Monastral Blue CSN, Monastral Blue FNX and Monastral Blue RL manufactured by Zeneca Co., Ltd., Catulia Cyanie L. PS manufactured by Francolor Co., Ltd., Cyanine Blue B-7000, Cyanie Blue B-7800 and Cyanie Blue B-8000 manufactured by Woo Snng Co., Ltd., Sunfast Blue 249-1282 manufactured by Sun Co., Ltd., Catulia Cyanine 1. JS manufactured by Fancolor Co., Ltd., Hpstaperm Blue BLF manufactured by Hoechst AG, Irgalite Blue GLNF, Irgalite Blue GLVD, Irgalite Blue ATC, CROMOPHTAL Blue A3R, MICROLITH Blue 4G-WA and MICROLITH Blue 4G-A manufactured by Ciba Specialty Chemicals Co., Ltd., Sovereign Blue 385, Holland Blue 212, Kingfisher Blue 211 and Olympic Blue 190 manufactured by Shepherd Co., Ltd., Ultramarine Blue manufactured by Luh Co., Ltd., Blue EP37 and Chromofine Blue 4920 manufactured by Dai Color Italy Co., Ltd., Endurophtal Blue BT-729D manufactured by Worlee Co., Ltd., Heucosine Blue G1737, Heucosine Blue HS-5000 and Lackecht Blue G1737 manufactured by Heubach Co., Ltd., Kenalake LFBRX manufactured by Kenalake Co., Ltd., Chromofine Blue 4930, Chromofine Blue 5188 and Chromofine Blue SR5020 manufactured by Dainichiseika Color & Chemicals MFG. Co., Ltd., Fastogen Blue 5030L, Fastogen Blue 5420SD, Fastogen Blue 5502, Fastogen Blue TGR-F and Fastogen Blue EP-7 manufactured by Dainippon Ink & Chemicals Inc., Cyanine Blue G-134, Cyanine Blue SAS, Cyanine Blue KRS and Cyanine Blue 4033 manufactured by Sanyo Shikiso Co., Ltd.

Various red pigments can be used as the red organic pigment and include, for example, C. I. Pigment Red 17, 144, 166, 170, 177, 202, 214, 220, 254, 255, 264 and 272, and they may be treated with a surfactant in the production step of the pigments.

The commercially available specific trade names thereof include pigments such as Chromophtal DPP RED BO, Chromophtal DPP RED BP, Chromophtal DPP RED DPP, Iragazin DPP Red BO, Iragazin DPP Red BTR, Chromophtal RED A 2B, Chromophtal RED A 3B, Chromophtal Scarlet R, Chromophtal Scarlet RN, Chromophtal Scarlet BR, Chromophtal Red BRN and Cinquasia Magenta TR 235-6 manufactured by Ciba Specialty Chemicals Co., Ltd., Dainichi Fast Poppy Red G and Dainichi Fast Poppy Red R manufactured by Dainichiseika Color & Chemicals MFG. Co., Ltd., Bayerrox Red 110M, Bayerrox Red 120MN and Bayerrox Red 130M manufactured by Bayer AG, Toluidine Red G G0335C, Toluidine Red RN0333C, Bonitol Red BM, Bonitol Red 4844C, Lysopac Red 4841C, Cappoxyt Red 4435B, Cappoxyt Red 4437B, Mineral Orange Thiosol GL, Mineral Orange Thiosol G, Mineral Orange Solipur GH, Mineral Red Solipur 3BH and Lysopac Red 7030C manufactured by Cappelle Co., Ltd., Copperas Red R9998 manufactured by Hercos Co., Ltd., Sicored L3750, Lithol Scharlach L4301, Litholechtmaroon L4763, Sicoflush-P-Maroon 4763, Paliogen Red Violet L5080, Sicotrans Red L2817, Sicomin Red L3025, Sicomin Red L3230s and Sico Fast Scarlet L4252 manufactured by BASF AG, Heucotron Red 230, Paliogen Red 3880HD, Paliogen L3920 and Paliogen Red L4210 manufactured by Heubach Co., Ltd., Horna Molybdator. MLN-74-SQ, Horna Molybdator. MLH-74-Q and Irgalite Red 3RS manufactured by Ciba Specialty Chemicals Co., Ltd., Toluidine Red L, Toluidine Red K, Bon Red SR, Bon Red 3M, Bon Red MP, Fast Bordeaux C, Lake Red C-900, Fast Red FGR and Chromophtal Red A2B and Chromophtal Red A3B manufactured by Woo Sung Co., Ltd., Novoperm Red Violet MRS new, Permanent Bordeaux FGR, Permanent Red FGR70, Hostaperm Rosa E and Novoperm Reel F3RK70 manufactured by Hoechst AG, Quindo Magenta RV6832 manufactured by Miles Co., Ltd., Perrindo Maroon R6422 manufactured by Bayer Mobay Co., Ltd. and Grapbhol Red 5BLS manufactured by Sandoz Co., Ltd.

Various yellow pigments can be used as the yellow organic pigment and include, for example, C. I. Pigment Yellow 1, 3, 12, 13, 14, 16, 17, 55, 81, 83, 74, 93, 94, 95, 97, 109, 110, 120, 128, 138, 147, 154, 155, 167, 185 and 191, and they may be treated with a surfactant in the production step of the pigments.

The commercially available specific trade names thereof include pigments such as Paliotol Yellow 2140HD, Sicopal Yellow L1110, Sicotan Yellow L1912, Sicomin Yellow L1622, Sicomin Yellow L1630S, Sicomin Yellow L1635S, Sicotrans Yellow L1916, Sico Yellow 1252HD, Paliogen Yellow L1482, Paliogen Yellow L1560, Paliotol Yellow D1155 and Paliotol Yellow L0960HD manufactured by BASF AG, Horna Chrome Yellow GMX AX-15, Horna Chrome Yellow GMXAH-35, Horna Chrome Yellow GU-15-SQ, Irgazin Yellow GO, Irgazin Yellow 2RLT, Irgazin Yellow 3RLTN, Irgazin Yellow 5GLT and, Irgazin Yellow 2GLTE manufactured by Ciba Specialty Chemicals Co., Ltd., Bayferrox 915, Bayferrox 920, Bayferrox 3420, Bayferrox 3910 and Bayferrox 3920 manufactured by Bayer AG, Novoperm Yellow H2G, Hostaperm Yellow H4G, Hostaperm Yellow H3G, Hostaperm Yellow H6G, Novoperm Yellow F2G and Novoperm Yellow HR70 manufactured by Hoechst AG, Pigment Yellow 1717, Pigment Yellow 1450, Pigment Yellow 1710, Pigment Yellow 1711, Pigment Yellow 1707, Pigment Yellow 8104, Pigment Yellow 1425 and light Fast Pigment Yellow R manufactured by Sanyo Shikiso Co., Ltd., SEIKA FAST YELLOW 10HG, SEIKA FAST YELLOW A-3, SEIKA FAST YELLOW 2035, SEIKA FAST YELLOW 2054, SEIKA FAST YELLOW 2300, SEIKA FAST YELLOW 2200, SEIKA FAST YELLOW 2270, SEIKA FAST YELLOW 2400(B), SEIKA FAST YELLOW 2500, SEIKA FAST YELLOW 2600, SEIKA FAST YELLOW ZAY-260, SEIKA FAST YELLOW 2700 (B) and SEIKA FAST YELLOW 2770 manufactured by Dainichiseika Color & Chemicals MFG. Co., Ltd., Sandrin Yellow SG, PV Fast Yellow HGR, Novoperm Yellow FGL, Novoperm Yellow H10G01, HANSA Yellow 10G, PV Fast Yellow H2G-01 and Permanent Yellow NCG manufactured by Clariant Co., Ltd.

Various green pigments can be used as the green organic pigment and include, for example, C. I. Pigment Green 7, 17, 36, 50 and 70, and they may be treated with a surfactant in the production step of the pigments.

The commercially available specific trade names thereof include pigments such as Chromofine Cyanine Green 2GN, Chromofine Cyanine Green 5301, Chromofine Cyanine Green 2GN, Chromofine Cyanine Green 537, Dainichi Cyanine Green FG, Dainichi Cyanine Green FGH and Chromofine Green 5370 manufactured by Dainippon Ink & Chemicals Inc., Fastogen Green 5005, Fastogen Green 5710, Fastogen Green B, Fastogen Green S, Fastogen Green SF, Fastogen Green SO and Fastogen Green 2YK manufactured by Dainichiseika Color & Chemicals MFG. Co., Ltd., Heliogen Green 8680, Heliogen Green 8681K, Heliogen Green 8682T, Heliogen Green 8730, Heliogen Green 8730K, Heliogen Green A, Heliogen Green GNA, Heliogen Green G, Heliogen Green GA, Heliogen Green GN, Heliogen Green GTA, Heliogen Green GV, Heliogen Green GWS, Heliogen Green K 8730, Heliogen Green L 8730, Fastgen Green MY, Fastgen Green YCN, Helio Fast Green GT, Heliogen Green 6G, Heliogen Green 6GA, Heliogen Green 8GA, Heliogen Green 9360, Heliogen Green K9360, Heliogen Green L9140 and Heliogen Green L9361 manufactured by BASF AG, Iragalite Fast Brilliant Green 3GL, Iragalite Fast Brilliant Green GL, Iragalite Green GLN and Iragalite Green 6G manufactured by Ciba Specialty Chemicals Co., Ltd., Liofast Green B237, Lionol Green B201, Lionol Green Y102, Lionol Green YS07, Lionol Green 2Y301, Lionol Green 2YS, Lionol Green 6YK and Lionol Green 6YKPCN manufactured by Toyo Ink MFG. Co., Ltd., Polymo Green FBH, Polymo Green FGH, Polymo Green 6G, Polymo Green G, Polymo Green GN and Polymo Green GN500 manufactured by Polymon Developments Ltd., Sanyo Cyanine Green, Sanyo Cyanine Green F6G, Sanyo Phthalocyanine Green F6G, Sanyo Phthalocyanine Green FB, Sanyo Phthalocyanine Green FB Pure, SAX, SAX (pigment) and Sanyo Phthalocyanine Green 6YS manufactured by Sanyo Shikiso Co., Ltd.

Various kinds of usual titanium oxide and fine particle titanium oxide can be used as the inorganic extender pigments. In addition thereto, talc and the like can be used.

The dyes and pigments described above may be used alone or in a mixture of two or more kinds thereof as the colorant used in the present invention, and the pigment preferably may be contained in the colorant from the viewpoint of exhibiting the brilliant drawn line density.

A content of the above colorants is preferably 10 to 60% by weight, more preferably 20 to 50% by weight in total based on the whole amount of the ink composition.

In a condition when a content of the above colorants is less than 10% by weight, the trouble that the drawn line density is low is caused. On the other hand, in a condition when a content of the above colorants is more than 60% by weight, the fluidity and the solubility of the dissolved components are lowered, and the storage stability is also lowered. Accordingly, both of the above conditions are not preferred.

Silica used in the present invention is added in order to form a coagulated matter containing at least silica in the ink composition without exerting an adverse effect on the writing property and the clear drain property to prevent the ink from leaking in the pressurized ballpoint pen.

Silica which can be used is particularly preferably anhydrous silica, and to be specific, it includes 50, 90G, 130, 200, 200V, 200CF, 200FAD, 300, 300CF, 380, 972R, 972V, R972CF, R974, R202, R805, R812, R812S, OX50, TT600, RX200, RY200 and MOX80 and MOX170 which are mixtures of RY200 and AL203 manufactured by Nihon Aerosil Co., Ltd., L90, LM-130, LM-5, M-5, M-5P, PTG, MS-55, MS-75, HS-5, EH-5, TS-530, TS-610 and TS-720 manufactured by CABOT Co. Ltd.

Preferred silica has a specific surface area of 80 $m^2/g$ or more measured by the BET method, and particularly preferred silica has a specific surface area of 200 $m^2/g$ or more and 450 $m^2/g$ or less.

A content of the above silicas is 0.5 to 5% by weight, preferably 1 to 3% by weight and more preferably 2.0 to 2.5% by weight based on the whole amount of the ink composition.

If a content of the above silica is less than 0.5% by weight, the ink leaking-preventing effect is reduced. On the other hand, if it exceeds 5% by weight, a viscosity of the ink becomes very high. Therefore, in said silica content regions, the ballpoint pen is unfavorable in handwriting. Accordingly, the said regions are not preferred.

The organic solvent used in the present invention is added for controlling the viscosity, accelerating dissolution of the dye, controlling dispersion of the pigment and controlling a drying property of the ink.

The organic solvent which can be used includes, for example, glycol solvents such as ethylene glycol, diethylene glycol, propylene glycol, dipropylene glycol, hexylene glycol and the like, ether solvents such as ethylene glycol monomethyl ether, ethylene glycol monoethyl ether, ethylene glycol monobutyl ether, 3-methyoxybutanol, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, diethylene glycol monophenyl ether, propylene glycol monomethyl ether, propylene glycol n-propyl ether, propylene glycol n-butyl ether, propylene glycol monoethyl ether, dipropylene glycol n-propyl ether, propylene glycol mono-n-butyl ether, propylene glycol monophenyl ether, dipropylene glycol monomethyl ether, dipropylene glycol monoethyl ether, dipropylene glycol n-butyl ether, dipropylene glycol monophenyl ether, tripropylene glycol monomethyl ether, tripropylene glycol monoethyl ether, tripropylene glycol n-butyl ether, propylene glycol methyl ether acetate, propylene glycol diacetate, dipropylene glycol dimethyl ether, tripropylene glycol monophenyl ether and the like, alcohol solvents such as benzyl alcohol, α-methylbenzyl alcohol and the like, propylene glycol methyl ether acetate, propylene glycol diacetate, N-methyl-2-pyrrolidone, rosin alcohol, water (refined water, ion-exchanged water, purified water and deep marine water) and the like. The above solvents can be used alone or in a mixture of two or more kinds thereof.

A content of the above solvents is preferably 30 to 80% by weight, more preferably 35 to 60% by weight based on the whole amount of the ink composition.

Further, in the present invention, various resins can be added for raising the fixing property, preventing strike-through of the drawn lines, a function as a dispersant for the pigment and the like, controlling the viscosity and accelerating dissolution of the dye.

The resins which can be used include, for example, toluenesulfonamide-epoxy resins, condensed resins of ketones such as cyclohexanone, acetophenone, urea and the like with formaldehyde, condensed resins of cyclohexanone and resins obtained by hydrogenating these resins, maleic acid resins, copolymers of styrene and maleic acid ester, copolymers of styrene and acrylic acid or esters thereof, polyvinylpyrrolidone, polyvinylbutyral, polyvinylacetal, polyamides which are the condensed resins of polymer fatty acids and polyamines, epoxy resins, polyvinyl alkyl ethers, coumarone-indene resins, polyterpenes, terpene resins, terpene-phenol resins, xylene resins, rosin base resins and hydrogenated resins thereof, rosin-modified maleic acid resins, vinylpyrrolidone-vinyl acetate copolymers, polymethacrylates, polyacrylic acid-polymethacrylic acid copolymers, polyoxyethylene and phenol resins. The above resins can be used alone or in a mixture of two or more kinds thereof.

A content of the above resins is preferably 0 to 30% by weight, more preferably 1 to 25% by weight based on the whole amount of the ink composition.

Further, the ink composition of the present invention for a pressurized ballpoint pen may further comprise a lubricant selected from the group consisting of the higher fatty acid, metallic soap, a phosphoric acid ester base lubricant, a nonionic surfactant having a long chain alkyl group or the like. In particular, oleic acid may be most suitably comprised therein. Further, suitable surfactants, dispersants and the like may also be comprised therein if necessary.

In the present invention, the viscosity has to be controlled to 10000 to 40000 mPa·s, preferably 20000 to 35000 mPa·s at 25° C. in terms of preventing the ink from leaking from the pen tip, elevating the write feeling, further shortening time to charge the ink reservoir with the ink and further raising the clear drain property.

If a condition when the above viscosity exceeds 40000 mPa·s, the write feeling becomes heavier, and it becomes difficult to smoothly write. On the other hand, in a condition when the viscosity is less than 10000 mPa·s, no problems are caused in the beginning, but as time passes, leaking of the ink is liable to be caused. Accordingly, both of these conditions are not preferred.

The ink composition of the present invention for a pressurized ballpoint pen can be produced by applying a conventionally known production process for an ink composition using the respective components described above. That is, the ink composition and the like for a pressurized ballpoint pen can be obtained by dissolving the respective solvent-soluble components by means of a stirring mixer. When using the pigment and the like, the pigment is dispersed together with the dispersant and the other components by means of a dispersing mixer, and then the necessary components are added and mixed, whereby the ink composition for a pressurized ballpoint pen can be obtained.

In the production, heating can be applied in order to dissolve the solid matters such as the dye and the like, and a filter and a centrifugal separator can be used, if necessary, in order to remove coarse particles of the organic pigment and the like.

In the present invention, the size and the number of the coagulated matters of silica can be controlled by, for example, a length of stirring time and a stirring power and the like. They can be controlled as well by making use of a dispersing apparatus and an emulsifying apparatus. A roll mill can be used for the ink composition of the present invention for a pressurized ballpoint pen since the composition is viscous.

The silica-coagulated matters contained in the ink composition of the present invention have a size of preferably 1 μm or more, and this makes it possible to efficiently prevent the ink from leaking from the pen tip. If the above coagulated matters of silica having a size of exceeding 200 μm are present in the form of a bulk, the ink is prevented from leaking, but a scratch feeling is liable to be brought about or some ink-squeezeout is liable to be caused. Therefore the size of the coagulated matters of silica is preferably 1 to 100 μm, but those size of 200 μm or more is unfavorable.

The number of the coagulated matters of silica as well as the range of the size described above is influenced and varied by a content of silica, a ball diameter at a pen tip, a clearance thereof and the like. It can be confirmed in the field of view of 500 μm×500 μm in an optical microscope, and if 10 or more bulks of the above coagulated matters can be observed in the said field, the ink can be prevented from leaking from the pen tip without causing any problems in terms of actual use. It is preferably controlled to 10 to 300 bulks.

Figure 1:
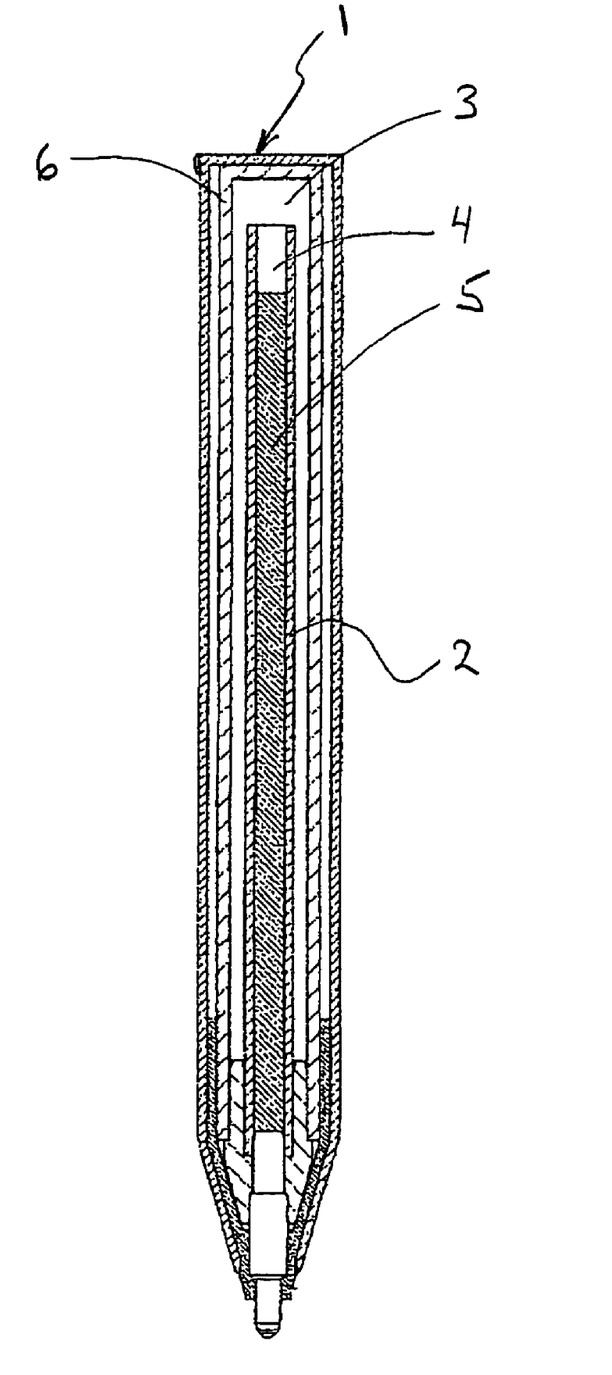
The drawing illustrates a pressurized ballpoint pen equipped with a refill in accordance with one aspect of the present invention.

The pressurized ballpoint pen of the present invention is charged with the ink composition of the present invention for a pressurized ballpoint pen, and the pressurized ballpoint pen structure shall not specifically be restricted as long as it is a ballpoint pen structure of a pressurized type. As may been seen from the drawing, a preferred pressurized ballpoint pen 1 is equipped with a refill 2 in which pressurized gas 3 such as nitrogen gas is charged into an ink reservoir 4 charged with the ink 5 and a closed vessel 6 containing the reservoir.

The ink composition of the present invention for a pressurized ballpoint pen thus constituted does not cause, though it does not have a very high viscosity, ink leaking from the pen tip as is observed in the prior arts. This is estimated to be attributable to the fact that the controlled bulks of silica which are dispersed in the ink plug up the clearance part which is the ink flow part, whereby the ink is prevented from leaking from the pen tip. The individual coagulated particles are aggregates of very small particles and therefore easily broken by rotation of the ball at the pen tip, whereby the ink flows out without any problems to make it possible to write.

The ink composition of the present invention for a pressurized ballpoint pen contains a viscous and adhesive resin in a blend composition, and the colorant is dissolved or finely dispersed. Accordingly, the ink quickly penetrates into a paper face to form beautiful drawn lines, so that the lines written on the paper face can not be erased by an eraser.

In the pressurized ballpoint pen of the present invention equipped with a refill in which pressurized gas is charged into an ink reservoir charged with the ink composition of the present invention for a pressurized ballpoint pen and a closed vessel containing the reservoir, the ink does not leak as shall be verified in examples described later to exhibit an excellent writing property and refill ink remaining amount visibility (clear drain property).

EXAMPLES

Next, the present invention shall be explained in further details with reference to examples and comparative examples, but the present invention shall not be restricted at all by the examples described below.

Examples 1 to 8 and Comparative Examples 1 to 6

Ink compositions having blend compositions shown in the following Table 1 and Table 2 were prepared by the following method.

In preparing the respective ink compositions, a pigment was first dispersed by means of a three roll mill or a bead mill using a part of a resin and a solvent out of the components as a dispersant, and the dispersions were transferred to a vessel equipped with a reflux condenser and a stirrer. Then, a part of the other components was added thereinto, and the mixtures were stirred at 60° C. for 5 hours. Thereafter, a prescribed amount of silica was added thereinto, and the mixtures each were treated by the following respective treating methods, and the remainders were added and stirred to prepare ink compositions.

A viscosity of the respective ink compositions was measured by means of a corn plate type viscometer (TV-20 type, manufactured by Tokimec Inc., standard corn: 1 rpm, rate of shear: 3.84 $s^{-1}$). The values of the viscosities in Table 1 are shown in terms of 1/100, and therefore the actual values thereof have to be magnified by 100 times in Example 1 and following Examples (for example, 31200 mPa·s in Example 1).

In the course of preparing the inks, the inks each were sampled in due course to observe them under a microscope having 10 (an ocular side)×10 (an objective side) magnification (manufactured by Nicon Co., Ltd, hereinafter the same shall apply) to observe the bulks of silica, and they were controlled so that the size and the numbers which were suited in the present invention were obtained, whereby the inks were prepared. The individual inks were prepared by the following detailed production process.

Example 1

Black Ink

After adding silica, the components were passed once through a three roll mill and recovered, and the remainder was added thereinto to prepare an ink.

Example 2

Black Ink

After adding silica, the components were passed once through the three roll mill and recovered, and the remainder was added thereinto to prepare an ink.

Example 3

Black Ink

After adding silica, the components were passed once through the three roll mill and recovered, and the remainder was added thereinto to prepare an ink.

Example 4

Red Ink

After adding silica, the components were passed twice through the three roll mill and recovered, and the remainder was added thereinto to prepare an ink.

Example 5

Red Ink

After adding silica, the components were stirred while cooling at 5000 rpm for one hour by means of a homomixer (T. K. homomixer; manufactured by Tokushu Kiko Kogyo Co., Ltd.) and then recovered, and the remainder was added thereinto, stirred and mixed to prepare an ink.

Example 6

Blue Ink

After adding silica, the components were stirred while cooling at 5000 rpm for one hour by means of the homomixer (T. K. homomixer; manufactured by Tokushu Kiko Kogyo Co., Ltd.) and then recovered, and the remainder was added thereinto, stirred and mixed to prepare an ink.

Example 7

Purple Ink

After adding silica, the components were stirred while cooling at 5000 rpm for one hour by means of the homomixer (T. K. homomixer; manufactured by Tokushu Kiko Kogyo Co., Ltd.) and then recovered, and the remainder was added thereinto, stirred and mixed to prepare an ink.

Example 8

Blue Black Ink

After adding silica, the components were stirred while cooling at 2500 rpm for 5 hours by means of a high speed stirrer (T. K. homodisper; manufactured by Tokushu Kiko Kogyo Co., Ltd.) and then recovered, and the remainder was added thereinto, stirred and mixed to prepare an ink.

Comparative Example 1

Black Ink

The pigment and all the remaining materials which were subjected in advance to dispersing treatment were mixed and stirred for 5 hours, and the mixture was passed 5 times through the three roll mill and then recovered, followed by adding the remainder to prepare an ink.

Comparative Example 2

Red Ink

The pigment and all the remaining materials which were subjected in advance to dispersing treatment were mixed and stirred for 5 hours, and the mixture was passed 5 times through the three roll mill and then recovered, followed by adding the remainder to prepare an ink.

Comparative Example 3

Blue Ink

After adding silica, the components were stirred while cooling at 5000 rpm for one hour by means of the homomixer (T. K. homomixer; manufactured by Tokushu Kiko Kogyo Co., Ltd.) and then recovered, and the remainder was added thereinto, stirred and mixed to prepare an ink.

Comparative Example 4

Black Ink

After adding silica, the components were stirred while cooling at 500 rpm for 5 hours by means of the high speed stirrer (T. K. homodisper; manufactured by Tokushu Kiko Kogyo Co., Ltd.) and then recovered, and the remainder was added, stirred and mixed to prepare an ink.

Comparative Example 5

Black Ink

An ink was prepared according to a production process shown in Example 2 described in Japanese Patent Application Laid-Open No. 195365/1998.

Comparative Example 6

Red Ink

An ink was prepared according to a production process shown in Example 4 described in Japanese Patent Application Laid-Open No. 195365/1998.

The ink compositions obtained in Examples 1 to 8 and Comparative Examples 1 to 6 described above were measured for the presence of the silica-coagulated matter bulks and the approximate number thereof by the following method. Further, the pressurized ballpoint pens were evaluated, that is, a writing property at 15° C., an ink leakage test and a refill ink remaining amount visibility were evaluated. The results thereof are shown in the following Table 1 and Table 2.

Measuring method of the presence of the silica-coagulated matter bulks and the approximate number thereof.

The inks were observed under a microscope having 10×10 magnification (an ocular side×an objective side) to take the photos of the states of the respective inks. A plotting film of 0.05×0.05 mm was put on the samples to measure an area.

The presence of the individual silica-coagulated matter bulks and the approximate size thereof were measured by an object microscale (minimum scale: 10 μm).

A slide glass and a cover glass used are ones used in a usual biological microscope, and the samples have an almost constant thickness, so that no specific problems are involved therein. When the samples are prepared in more accurate thickness, a blood cell calculating board and a bacterial calculating board which have a constant depth may be used.

The red, blue, purple and blue black inks prepared in Examples 4 to 8 and Comparative Examples 2 and 3 could be observed directly under a microscope. However, the black inks prepared in Examples 1 to 3 and Comparative Examples 1, 4 and 5 were liable to be short of a light quantity. Accordingly, an ink weight on the slide glass was measured, and the same amount of a solvent was added thereinto and slightly mixed by means of a pin and the like. Then, the samples were observed. In the above case, the number of the bulks was doubled after counting.

Evaluation Method of Pressurized Ballpoint Pen

The respective ink compositions 0.3 ml prepared in the respective examples and comparative examples described above were charged and then assembled into SJP-7 manufactured by Mitsubishi Pencil Co., Ltd. in the state that a pressure of approximate 3000 hpa was maintained by nitrogen gas to prepare pressurized oil-based ballpoint pens for test, and they were used for a writing property test and an ink leakage test.

Writing Property Test Method:

The respective pressurized ballpoint pens for a test obtained above were used for writing on a writing paper by a free hand to evaluate a smoothness and a lightness of a write feeling according to the following evaluation criteria.

Evaluation Criteria:
⊚: very smooth and light write feeling
○: smooth and light write feeling
Δ: write feeling slightly short of smoothness and lightness
ΔΔ: a little heavy write feeling
x: very heavy write feeling Ink Leakage Test Method:

In the ink leakage test, the respective pressurized ballpoint pens for a test were subjected to waste writing and then left standing at a temperature of 25° C. and a humidity of 60% for 7 days with a pen tip turning downward to measure an amount of the ink leaking from the pen tip, and the most frequent value in the ten samples was taken and evaluated according to the following evaluation criteria.

Evaluation Criteria:
⊚: ink leakage is not observed at all
○: a very small amount of ink leakage is observed at pen tip
Δ: a middle amount of ink leakage is observed at pen tip
ΔΔ: a large amount of ink leakage is observed at pen tip
x: ink leaks and drops Visibility Evaluating Method for Refill Ink Remaining Amount in Pressurized Ballpoint Pen:

The respective inks prepared were charged into a refill comprising a polypropylene tube (treated an inside thereof with silicone) and a stainless tip (ball made of cemented carbide and having a diameter of 0.7 mm), and then it was subjected to a writing test in the state that a pressure of approximate 3000 hpa was maintained by nitrogen gas applied from the rear part of a refill. After writing 500 m, a sticking state of the ink onto the inside of the polypropylene tube in the ink-consuming part was visually evaluated according to the following evaluation criteria.

Evaluation Criteria:
⊚: ink is not stuck at all
○: a very small amount of ink is observed to be stuck
Δ: ink is observed to be stuck in a circle form
ΔΔ: ink is observed to be continuously stuck upward and downward
x: ink is observed to be stuck in almost all area and whole circumference

TABLE 1

(blend unit: % by weight, total 100 %)

| | Example | | | | | | | |
|---|---|---|---|---|---|---|---|---|
| | 1 | 2 | 3 | 4 | 5 | 6 | 7 | 8 |
| Colorant: (drawn line color, BB: blue black) | Black | Black | Black | Red | Red | Blue | Purple | BB |
| C. I. Pigment Red 254 | | | | 10 | | | | |
| C. I. Pigment Red 255 | | | | | 7 | | | |
| C. I. Pigment Blue 60 | | | | | | 8 | 7 | 7 |
| Carbon black*1 | | 7 | 7 | | | | | |
| Soil-like graphite*2 | 5 | | | | | | | |
| Nigrosine Base EX*3 | 22 | 20 | 22 | | | | | 6 |
| Aizen Spiron Violet C-RH*4 | 10 | 10 | 10 | | | 5 | 3.5 | 3.5 |
| Aizen Spiron Yellow C-2GH*4 | | 5 | | | | | | |
| Aizen Spiron Yellow C-GNH*4 | 5 | | 5 | 5 | 5 | | | |
| Aizen Spiron Red C-GH*4 | | | | 10 | 15 | | 17 | |
| Aizen S.B.N. Blue 701*4 | | | | | | 10 | | 10 |
| Solvent: | | | | | | | | |
| Benzyl alcohol | 33.5 | 43 | 33 | 29 | 32.3 | 41 | 37 | 36.5 |
| 2-Phenoxyethanol | | | | 20 | 16 | | | |
| Dipropylene glycol | | | | | | 10 | 10 | 10 |
| Ethylene glycol monobenzyl ether | 10 | | 10 | | | | | |
| Resin: | | | | | | | | |
| Polyvinylbutyral resin*5 | 2.5 | | | 5 | 4 | 5 | 5 | 5 |
| Synthetic Resin*6 | | 4 | 4 | 15 | 13 | 14 | 14 | 10 |
| Rosin alcohol*7 | | | | | | | | 5 |
| Polyvinylpyrrolidone (K-90)*8 | 1.5 | 1 | 1 | 1 | 1.5 | 1.5 | 1.5 | 1.5 |
| Silica (Aerosil 380)*9 | 2.5 | 2 | 1.5 | 2 | 2.2 | 2.5 | 2 | 2.5 |
| Other components: | | | | | | | | |
| Oleic acid | 8 | 8 | 5 | 3 | 2 | 3 | 3 | 3 |
| Polyoxyethylenedodecylamine*10 | | | | | 1 | | | |
| Phosphoric acid ester | | | 1.5 | | 1 | | | |

TABLE 1-continued (blend unit: % by weight, total 100 %)

| | Example | | | | | | | |
|---|---|---|---|---|---|---|---|---|
| | 1 | 2 | 3 | 4 | 5 | 6 | 7 | 8 |
| Presence of silica-coagulated matter bulk of 1μm or more | Present | Present | Present | Present | Present | Present | Present | Present |
| Approximate number of silica-coagulated bulk (falling in a range of 500 × 500 μm) | 212 or more | 104 or more | 28 or more | 38 or more | 31 or more | 40 or more | 40 or more | 95 or more |
| Viscosity (mPa·s × 100, at 25° C.) | 312 | 220 | 180 | 360 | 330 | 325 | 198 | 320 |
| Writing property (at 150 ° C.) | ⊚ | ⊚ | ⊚ | ○ | ⊚ | ⊚ | ⊚ | ⊚ |
| Ink leakage test | ⊚ | ⊚ | ○ | ⊚ | ⊚ | ⊚ | ○ | ⊚ |
| Refill ink remaining amount visibility | ⊚ | ⊚ | ⊚ | ⊚ | ⊚ | ⊚ | ⊚ | ⊚ |

TABLE 2

(blend unit: % by weight, total 100 %)

| | Comparative Example | | | | | |
|---|---|---|---|---|---|---|
| | 1 | 2 | 3 | 4 | 5 | 6 |
| Colorant: | Black | Red | Blue | Black | Black | Red |
| C. I. Pigment Red 254 | | 10 | | | | |
| C. I. Pigment Blue 60 | | | 8 | | | |
| Carbon black*1 | 7 | | | 7 | | |
| Nigrosine Base EX*3 | 20 | | | 20 | | |
| Valifast Black #1802*3 | | | | | 15 | |
| Aizen Spiron Violet C-RH*4 | 10 | | 5 | 10 | 10 | |
| Aizen Spiron Yellow C-2GH*4 | 5 | | | 5 | | |
| Aizen Spiron Yellow C-GNH*4 | | 5 | | | | |
| STP Orange 6*3 | | | | | | 15 |
| Valifast Yellow AUM*4 | | | | | 5 | |
| Aizen Spiron Red C-GH*4 | | 10 | | | | 4 |
| Aizen Spiron Red C-BH*4 | | | | | | 4 |
| Aizen S.B.N. Blue 701*4 | | | 10 | | | |
| Solvent: | | | | | | |
| Benzyl alcohol | 37 | 30 | 48 | 40.5 | 10 | 10 |
| 2-Phenoxyethanol | | 22 | | | 42.5 | 37.5 |
| Dipropylene glycol | | | 10 | | | |
| Resin: | | | | | | |
| Polyvinylbutyral resin*5 | 10 | 4 | 2 | 3.5 | | |
| Synthetic Resin*6 | | 13 | 10 | 3 | | |
| Ketone resin*11 | | | | | 13 | |
| Polyvinylpyrrolidone (K-90)*8 | 1 | 1 | 1.5 | 1 | | 1 |
| Polyvinylpyrrolidone (K-30)*12 | | | | | | 25 |
| Silica (Aerosil 380)*9 | 2 | 2 | 2.5 | 2 | 0.5 | 0.5 |
| Silica (Aerosil 200)*13 | | | | | 1 | |
| Other components: | | | | | | |
| Oleic acid | 8 | 3 | 3 | 8 | 3 | 3 |
| Presence of silica-coagulated matter bulk of 1 μm or more | None | None | Present | Present | None | None |
| Approximate existing number of silica-coagulated bulk (in a range of 500 × 500 μm) | 0 | 0 | 92 or more | Refer to remark | 0 | 0 |
| Viscosity (mPa·s × 100, at 25° C.) | 1015 | 321.5 | 78 | 435 | 85 | 162 |
| Writing property (at 15° C.) | X | ○ | Δ | ΔΔ | ○ | ΔΔ |
| Ink leakage test | X | X | X | ⊚ | X | X |
| Refill ink remaining amount visibility | X | ○ | ○ | ΔΔ | ○ | ΔΔ |

Remark: 2 bulks of 200 μm or more and 30 bulks of the other sizes were observed in Comparative Example 4.

*1 to *13 in Table 1 and Table 2 mean the following:
*1: MA8 manufactured by Mitsubishi Chemical Corporation
*2: Soil-like graphite T-1 manufactured by Nippon Graphite Industries Ltd.
*3: manufactured by Orient Chemical Industries Ltd.
*4: Alcohol-soluble dye, manufactured by Hodogaya Chemical Co., Ltd.
*5: S-Lec B BL-1, manufactured by Sekisui Chemical Co., Ltd.
*6: Synthetic Resin SK, manufactured by Huels AG
*7: ABITOL, manufactured by Hercules Incorporated
*8: PVP K90, manufactured by ISP Co., Ltd.
*9: Aerosil 380, the BET specific surface area: 380 $m^2/g$, manufactured by Nihon Aerosil Co., Ltd.
*10: Nimine L202, manufactured by Nihon Oil & Fat Corporation
*11: Hilac #111, manufactured by Hitachi Chemical Co., Ltd.
*12: PVP K30, manufactured by ISP Co., Ltd.
*13: Aerosil 200, the BET specific surface area: 200 $m^2/g$, manufactured by Nihon Aerosil Co., Ltd.

As apparent from the results shown in Table 1 and Table 2 described above, it was found out that the ink compositions for a pressurized ballpoint pen each prepared in Examples 1 to 8 falling in the scope of the present invention are prevented from leaking from the pen tip and are excellent in a write feeling as well as a clear drain property as compared with those prepared in Comparative Examples 1 to 6 falling outside the scope of the present invention.

In Examples 1 to 8 and Comparative Example 3, observation of the size of the silica-coagulated matters resulted in finding that it fell in a range of 1 to 100 µm. In Comparative Example 3, the ink leaked since the viscosity was less than 10000 mPa·s, and the writing property was inferior. In Comparative Example 4, the size of the silica-coagulated matters exceeded 200 µm in some matters, and the viscosity exceeded 40000 mPa·s, so that the writing property and the remaining amount visibility were inferior.

Further, Comparative Examples 5 and 6 are Example 2 (silica content: 1.0% by weight) and Example 4 (silica content: 0.5% by weight) each specifically described in Japanese Patent Application Laid-Open No. 195365/1998. In these cases, it was found out that the silica-coagulated matters are not prepared and the inks stay in a homogeneous state, so that brought about is the problem that the inks leak from the pen tips.

INDUSTRIAL APPLICABILITY

According to the present invention, provided are an ink composition for a pressurized ballpoint pen and a pressurized ballpoint pen which can prevent an ink from leaking from a pen tip and are excellent in a write feeing and which can shorten time for charging an ink reservoir with the ink and are excellent as well in a clear drain property.

What is claimed is:

1. An ink composition for a pressurized ballpoint pen comprising at least a colorant, a solvent and 0.5 to 5 wt% silica having a specific surface area of 80 $m^2/g$ or more measured by the BET method,
   wherein a coagulated matter containing at least the silica is contained therein, said the coagulated matter having size of 1 to 200 µm and the ink composition has a viscosity of 10000 to 40000 mPa·s at 25°.

2. The ink composition for a pressurized ballpoint pen as described in claim 1, wherein the coagulated matter containing at least silica has a size of 1 to 100 µm.

3. The ink composition for a pressurized ballpoint pen as described in claim 2, wherein 10 or more coagulated matters containing at least silica are observed in a range of 500 µm×500 µm under an optical microscope.

4. A pressurized ballpoint pen equipped with a refill, in which pressurized gas is charged into an ink reservoir charged with the ink composition for a pressurized ballpoint pen as described in claim 3 and a closed vessel containing the reservoir.

5. A pressurized ballpoint pen equipped with a refill, in which pressurized gas is charged into an ink reservoir charged with the ink composition for a pressurized ballpoint pen as described in claim 2 and a closed vessel containing the reservoir.

6. The ink composition for a pressurized ballpoint pen as described in claim 1, wherein 10 or more coagulated matters containing at least silica are observed in a range of 500 µm×500 µm under an optical microscope.

7. A pressurized ballpoint pen equipped with a refill, in which pressurized gas is charged into an ink reservoir charged with the ink composition for a pressurized ballpoint pen as described in claim 6 and a closed vessel containing the reservoir.

8. A pressurized ballpoint pen equipped with a refill, in which pressurized gas is charged into an ink reservoir charged with the ink composition for a pressurized ballpoint pen as described in claim 1 and a closed vessel containing the reservoir.

* * * * *